H. O. COSTELLO.
HEIGHT GAGE ATTACHMENT FOR MICROMETER CALIPERS.
APPLICATION FILED JUNE 29, 1917.
1,265,431.
Patented May 7, 1918.
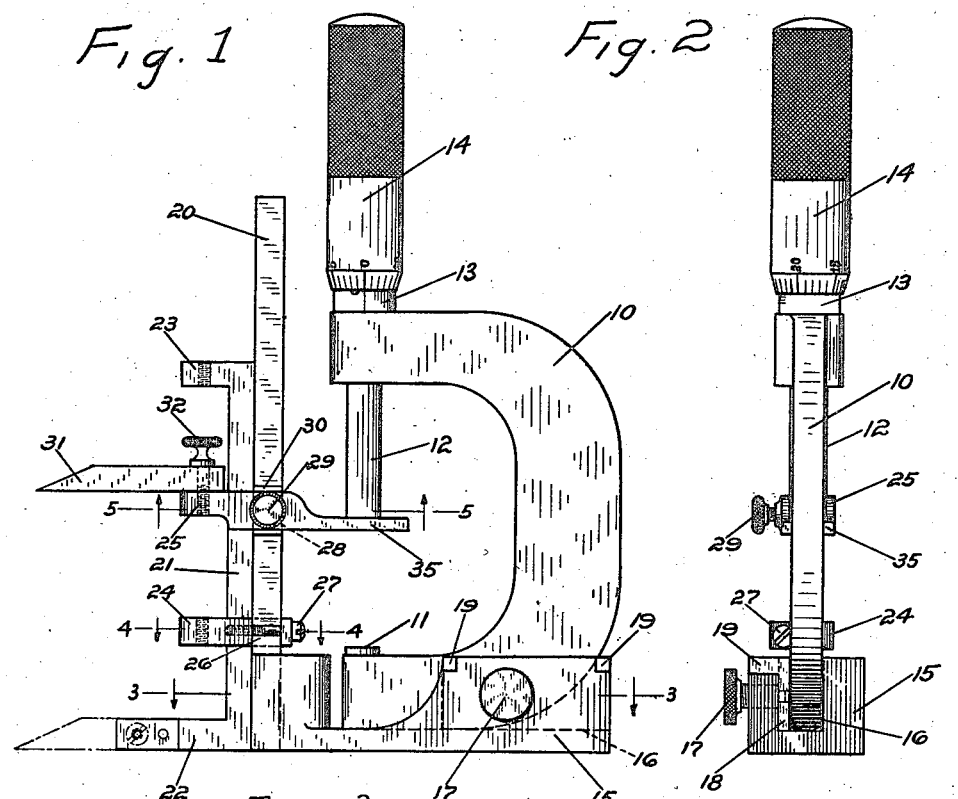
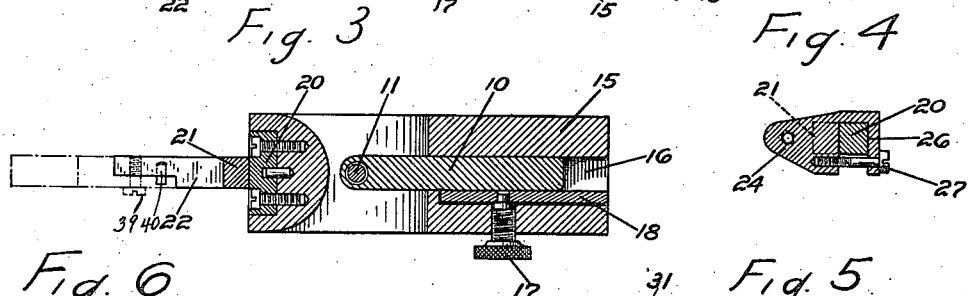
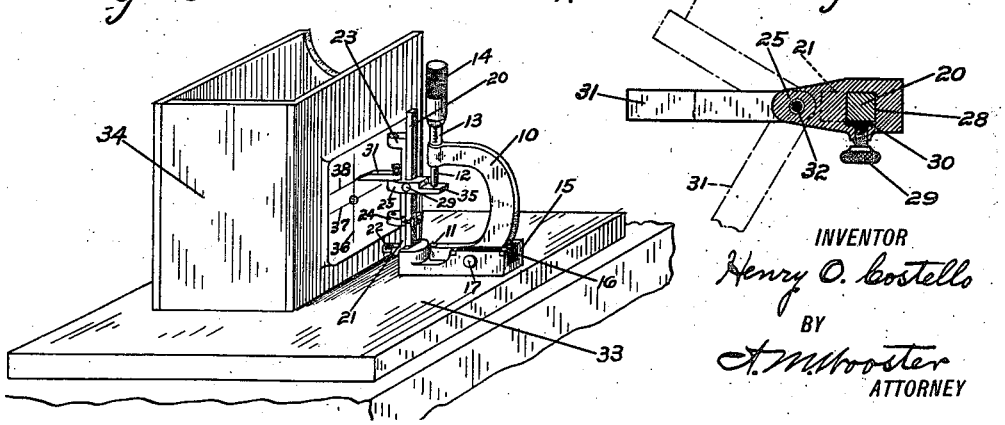
INVENTOR
Henry O. Costello
BY
A. M. Wooster
ATTORNEY

UNITED STATES PATENT OFFICE.

HENRY O. COSTELLO, OF BRIDGEPORT, CONNECTICUT.

HEIGHT-GAGE ATTACHMENT FOR MICROMETER-CALIPERS.

1,265,431. Specification of Letters Patent. Patented May 7, 1918.

Application filed June 29, 1917. Serial No. 177,824.

*To all whom it may concern:*

Be it known that I, HENRY O. COSTELLO, a citizen of the United States, residing at Bridgeport, county of Fairfield, State of Connecticut, have invented an Improvement in Height-Gage Attachments for Micrometer-Calipers, of which the following is a specification.

This invention has for its object to provide a relatively simple and inexpensive attachment adapted for use in connection with micrometer calipers, which may be easily attached and will make of the combined tool a much quicker and easier height gage to read with accuracy than an ordinary vernier height gage.

With these and other objects in view I have devised the novel height gage attachment which I will now describe referring to the accompanying drawing forming a part of this specification and using reference characters to indicate the several parts.

Figure 1 is a view showing in elevation my novel attachment applied to a micrometer caliper and ready for use;

Fig. 2 an end view as seen from the right in Fig. 1;

Fig. 3 a section on the line 3—3 in Fig. 1, looking in the direction of the arrows;

Fig. 4 a section on the line 4—4 in Fig. 1 looking in the direction of the arrows;

Fig. 5 a section on the line 5—5 in Fig. 1 looking in the direction of the arrows, and Fig. 6 is a perspective view illustrating the use of the combined tool as a height gage.

10 denotes the frame, 11 the anvil, 12 the spindle, 13 the barrel and 14 the sleeve of an ordinary micrometer caliper, in the present instance a two-inch caliper.

My novel attachment comprises a base 15, which is provided with a socket 16 adapted to receive the anvil end of the frame of a micrometer caliper, which is locked therein by a set screw 17 shown as bearing against a friction plate 18. The friction plate is shown as provided with lugs 19 adapted to engage recesses in the base which retain the friction plate in place. 20 denotes a vertical standard which is rigidly secured to the other end of the base and carries the slide 21. The slide is provided at its lower end with a lug 22, at its upper end with a lug 23 and intermediate said lugs with lugs 24 and 25. These lugs are all fixed portions of the slide. Lug 24 is provided with a recess 26 which receives the standard, the parts being retained against displacement by a set screw 27 which crosses the recess, this lug serving merely as a guide and the special structure being unimportant so far as the present invention is concerned. Lug 25 is shown as provided with a recess 28 closed on four sides which receives the standard, the entire slide being locked at any required adjustment on the standard by means of a thumb screw 29 bearing against a friction plate 30. One of the lugs, in the present instance lug 25, is extended to provide a stop 35 which is adapted to be engaged by the spindle, as shown. 31 denotes a scriber, which is adapted for attachment to either lugs 23, 24 or 25 by means of a thumb screw 32, and is adapted to oscillate in the horizontal plane. Should the conditions of use require it, the scriber may be placed in various positions out of alinement with the lug, as indicated by dotted lines in Fig. 5. Another scriber indicated by dotted lines in Figs. 1 and 3 is provided for use in connection with lug 22. The scriber for lug 22 is shown as attached by means of a horizontal screw 39, and a dowel pin 40 instead of by a vertical screw. These details of construction, however, are unimportant so far as the principle of the invention is concerned.

In Fig. 6, 33 indicates an accurately finished surface plate and 34 a jig in connection with which my novel attachment is being used.

The operation is as follows. The micrometer caliper illustrated has a two-inch capacity between the spindle and the anvil. The attachment, however, increases the capacity, and the attachment and micrometer caliper combined may be used to scribe a line within the limits of zero and four inches, to a thousandth of an inch. The figures of the drawing, with the exception of Fig. 6, are full size. From the bottom of lug 22 to the top of lug 24, from the top of lug 24 to the top of lug 25, and from the top of lug 25 to the top of lug 23 is in each instance one inch. Scriber 31 is used in making all measurements at a height greater than one inch above the surface plate. For heights of less than one inch above the surface plate the other scriber, indicated by dotted lines only, is used in connection with lug 22. For use in connection with a one-inch micrometer caliper, it would be necessary to use a slide having its stop 35 upon lug 24.

As an illustration of the operation of my novel attachment, let us suppose that jig 34 is a piece of work and that it is required to scribe for a hole to be drilled two inches above a surface plate and another to be drilled two and one-half inches above the surface plate and in vertical alinement with the first hole. For convenience the vertical line indicated by 36 would be first scribed upon the piece. This would be effected by placing the piece in such a position on the surface plate that the required line would be parallel with the surface plate, then adjusting the scriber in the manner about to be described, and then scribing the line. The holes are positioned by taking the points of intersection of horizontal lines crossing the vertical line as points for the drill center. The parts are shown in Fig. 1 in position for scribing the lower horizontal line indicated by 37. The slide and stop 35 are locked in position by thumb screw 29 with the under side of lug 22 in registry with the under side of base 15, which leaves the operative face of the stop exactly two inches above the surface plate when the base is resting thereon. This positioning of the parts however, should be checked up by the micrometer, the sleeve is therefore turned to place the operative face of the spindle just in contact with the operative face of the stop. In this position the scale upon the micrometer sleeve and the scale upon the micrometer barrel should each register zero. Line 37 may then be scribed in the usual manner, that is by moving the scriber over the face of the work. In order to locate the center of the other hole it is necessary to make a horizontal line indicated by 38 on the work two and one-half inches above the surface plate. The sleeve is turned backward to place the operative face of the spindle just one and one-half inches above the operative face of the anvil. In this position, the scale upon the micrometer sleeve will indicate zero and the scale upon the micrometer barrel will indicate five-tenths of an inch. Thumb screw 29 is then loosened and the sleeve and stop are moved upward on the standard to place the operative face of the stop just in contact with the operative face of the spindle, in which position the slide and stop are locked by thumb screw 29. Line 38 may then be scribed in the usual manner.

Having thus described my invention, I claim:—

1. A height gage attachment for micrometer calipers, comprising a base provided with a standard, means for attaching a micrometer caliper to the base, a slide adjustable on the standard, a stop on the slide which coöperates with the spindle of a micrometer caliper attached to the base, and a scriber attached to the slide.

2. A device of the character described, comprising a base, a standard secured thereto, means for attaching a micrometer caliper to the base, a slide on the standard having lugs, a scriber attached to one of said lugs, and a stop on the slide which coöperates with the spindle of a micrometer caliper attached to the base to adjust the scriber.

3. A device of the character described, comprising a base provided with a standard, means for attaching a micrometer caliper to the base, a slide on the standard, a scriber attached to the slide, a stop on the slide which coöperates with the spindle of a micrometer caliper attached to the base, and means for locking the slide with the scriber at an adjustment determined by the adjustment of the micrometer spindle.

4. A device of the character described, comprising a base provided with a standard, means for attaching the frame of a micrometer caliper to the base, a slide on the standard having a stop which coöperates with the spindle of a micrometer caliper attached to the base, and a plurality of lugs, and a scriber adapted for attachment to any of the lugs, the adjustment of the scriber being determined by adjusting the micrometer spindle and then placing the stop in contact therewith.

5. A device of the character described, comprising a base having a socket adapted to receive the frame of a micrometer caliper, and provided with a standard, means for securing the frame of a micrometer caliper to the base, a slide on the spindle having a stop adapted to coöperate with the spindle of a micrometer caliper, a scriber adjustably secured to the slide and means for securing the slide to the standard after the spindle of the caliper has been adjusted and the stop placed in contact therewith.

6. A device of the character described, comprising a base having a standard, means for attaching the frame of a micrometer caliper to the base, a slide on the standard having a stop adapted to coöperate with the spindle of a micrometer caliper secured to the base, and a scriber pivoted to the slide and oscillatable in the horizontal plane.

7. A device of the character described, compirsing a base having a standard, means for attaching the frame of a micrometer caliper to the base, a scribing slide on the standard, having a stop adapted to coöperate with the spindle of a micrometer caliper secured to the base, and means for locking the scribing slide to the standard at the required adjustment.

In testimony whereof I affix my signature.

HENRY O. COSTELLO.